United States Patent [19]

Valerij et al.

[11] Patent Number: 5,790,662
[45] Date of Patent: Aug. 4, 1998

[54] DATA CARRIER AND WRITE/READ DEVICE THEREFOR

[75] Inventors: Stephanov Valerij, Steinhausen; Tompkin Wayne Robert, Ennetbaden; Staub René, Cham. all of Switzerland; Otto Carsten, Maintal, Germany

[73] Assignee: Landis & Gyr Technology Innovation AG, Zug, Switzerland

[21] Appl. No.: 550,192

[22] Filed: Oct. 30, 1995

[30] Foreign Application Priority Data

Nov. 15, 1994 [CH] Switzerland ............... 3421/94

[51] Int. Cl.$^6$ .................................................. H04L 9/00
[52] U.S. Cl. ............................................................ 380/2
[58] Field of Search ............................. 380/2, 4, 23, 380, 380/54; 235/491

[56] References Cited

U.S. PATENT DOCUMENTS

| | | | |
|---|---|---|---|
| 4,034,211 | 7/1977 | Horst et al. | 380/54 |
| 5,027,401 | 6/1991 | Soltesz | 380/23 |
| 5,546,462 | 8/1996 | Indeck et al. | 380/23 |
| 5,548,106 | 8/1996 | Liang et al. | 235/491 |
| 5,613,012 | 3/1997 | Hoffman et al. | 235/380 |

FOREIGN PATENT DOCUMENTS

| | | |
|---|---|---|
| 0 215 187 | 3/1987 | European Pat. Off. . |
| 28 02 430 | 7/1978 | Germany . |
| 598661 | 5/1978 | Switzerland . |
| 664 635 | 3/1988 | Switzerland . |
| WO-A-92 01975 | 2/1992 | WIPO . |

*Primary Examiner*—Salvatore Cangialosi
*Attorney, Agent, or Firm*—Meltzer, Lippe, Goldstein et al.

[57] ABSTRACT

A data carrier with an electronic circuit for storing and processing data is provided with an information strip with optically readable markings, and preferably a test field and an authentication feature. An optical interface, for example, can be provided for communication with a write/read device. The markings represent a digital signature. Testing of the authenticity of the data carrier can be done on the basis of the physical properties of the markings, the internal structure of the signature and/or the proof that a test number stored in the electronic circuit is equal to a number calculated from the signature according to a pre-determined function. The signature can also serve as a cryptographic key for encoding and decoding the data to be exchanged between the electronic circuit and the write/read device. The test field can be irreversibly modified when the data carrier is used. The write/read device contains an optical reading head for machine reading the markings and is optionally connected to a data processing point by means of a communication network.

12 Claims, 1 Drawing Sheet

DATA CARRIER AND WRITE/READ DEVICE THEREFOR

BACKGROUND OF THE INVENTION

1. Field of the Invention

The invention relates generally to a data carrier of the type having an electronic circuit for storing and processing data and for communicating with a write/read device, the said data carrier having machine readable optical diffraction markings for proving authenticity of said data carrier. The invention also relates generally to a write/read device for such a data carrier, and apparatus incorporating same.

Such data carriers are suitable for cashless payment for services of all types, for example for calls made from public telephones, goods purchased, in restaurants, for parking fees, bus tickets and so on. They are also suitable for electronic identity media such as driving licences, health insurance certificates, credit cards, bank cards and so on. As they are provided with an electronic circuit for storing and processing data, as well as for communication with a write/read device, they are also known for example as chip cards or smart cards, and so on. A summary of possible applications is given in the article "Der Mikrorechner in der Brieftasche" in Vol. 20/1993 of the magazine "Elektronik". The measurements of such chip cards correspond, for example, to the ISO/IEC standard 7816.

2. Description of the Prior Art

A data carrier of the type described in the preamble of claim 1 is known from CH 664 635. With this data carrier optical diffraction markings, which are difficult to forge, serve as the authentication feature, which when used in conjunction with a write/read device is checked thereby. Further optical markings serve as units of value for larger amounts of money, while smaller remaining amounts are stored in an electronic memory.

SUMMARY OF THE INVENTION

The object of the invention is to provide a data carrier and an associated write/read device with improved security against forgery, imitation or fraudulent use of the data carrier.

According to one aspect of the invention there is provided a data carrier having an electronic circuit for storing and processing data and for communicating with a write/read device, the said data carrier having machine readable optical diffraction markings for proving authenticity of said data carrier, wherein said markings represent a digital signature and wherein data which is linked to said signature is stored in said electronic circuit.

Respective further aspects of the invention are set forth in claims 8 and 12.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENT

Figure 1:
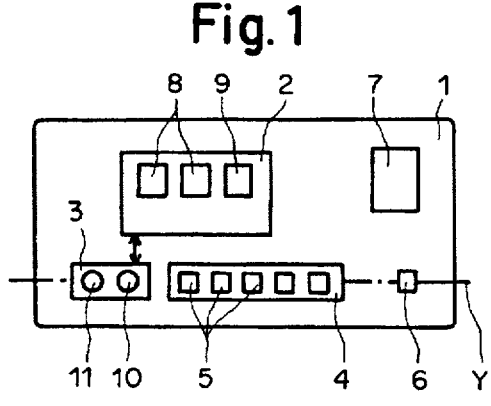
FIG. 1 shows a data carrier.

FIG. 1 shows a data carrier 1 with an electronic circuit 2 for the storing and processing of data, and an optical interface 3 for communicating with a write/read device. The data carrier 1 is additionally provided with an information strip 4 with optically readable markings 5, a test field 6 and an authentication feature 7. The electronic circuit 2 contains inter alia different memory areas 8 which differ with respect to whether the information stored in them (data and/or program sections) is accessible to the outside world and whether this information can be changed. One of the memory areas 8 is an electronic non-volatile information memory 9, the content of which is accessible to the write/read device. The information strip 4 with the markings 5, the optical interface 3 and the test field 6 are arranged along an axis y which is parallel to the direction in which the data carrier 1 has to be inserted in the write/read device. The exchange of data between the data carrier 1 and the write/read device is carried out by means of the optical interface 3, for which purpose it is provided with a light source 10 such as, for example, a light-emitting diode or a laser diode for sending data from the data carrier 1 to the write/read device and a light-sensitive cell 11 such as, for example, a photo diode, a photo transistor, a photo multiplier or a solar cell for receiving the data sent from the write/read device. The optical interface 3 can also be an LC display, wherein the LC display modulates the intensity or polarisation of a beam of light emitted by the write/read device. The use of a solar cell allows the data carrier 1 to be supplied with light energy by means of the write/read device. Instead of the optical interface 3, the data carrier 1 can also be provided with a field with electronic contact surfaces or coils, wherein the exchange of data then takes place electronically, for example in accordance with the ISO/IEC standard 7816-3, or contact-free in an inductive manner, for example in accordance with ISO/IEC standards 10536-2 and/or 10536-3. A microprocessor is often used for the internal control of the data carrier 1.

The authentication feature 7 is, for example, a KINEGRAM® visible to the naked eye, a hologram, a kinoform or otherwise any OVD (optically variable device) which, for example, can be directly embossed in the surface of the data carrier 1 or be stuck into a recess on the surface of the data carrier 1 in the manner of a laminate made from plastics foil, as it is also used for distinguishing credit cards, passes or other identification means. The authentication feature 7 represents a security characteristic which gives the user of the data carrier 1 a simple proof of authenticity and can protect him from buying a forged data carrier 1.

The markings 5 are configured as fields, the edges of which do not come into contact with one another, wherein preferably each field contains a structure effective by optical diffraction. A suitable structure effective by optical diffraction is, for example, a relief pattern which is applied directly to the surface of the data carrier 1 or, according to European Patent application EP 401 466 A1, is embedded in a laminate made from plastics foil, wherein the laminate is glued to the data carrier 1 flush with the surface of the data carrier 1. A summary of the materials suitable for manufacturing is contained in U.S. Pat. No. 4,856,857. Diffraction structures of this type are distinguished by a high degree of security against forgery or copying.

Figure 2:
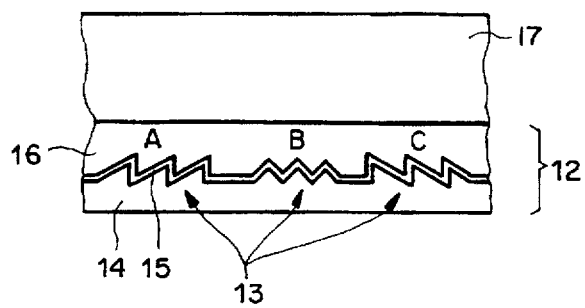
FIG. 2 illustrates a layer composition with optical markings.

FIG. 2 shows a cross-section of a layer composition 12 with triangular (B) and saw-tooth shaped (A,C) relief structures 13. The layer composition 12 is composed of a thermoplastic varnish layer 14 which is covered with a reflective layer 15 and an adhesive layer 16. A support foil 17 is attached to the side of the adhesive layer 16 opposite the reflective layer 15. The relief structures 13 are phase diffracting gratings, the diffraction effects of which are determined by the parameters of the linear distance, profile and azimuth. The markings 5 (FIG. 1) are produced in the varnish layer 14 by embossing. A grating with an asymmetrical profile diffracts different amounts of light in the positive as well as in the negative orders of diffraction, wherein with a saw-toothed profile, the ratio of the intensities of the first plus to the first minus order of diffraction can be, for example, 8:1. The connection of the layer composition 12 to the surface of the data carrier 1 (FIG. 1) is done by means of a transfer process, wherein the support foil 17 is removed and a covering layer covering the entire surface of the data carrier 1 is attached. The covering layer is a thermally stable printable and advantageously UV-hardenable varnish, the softening point of which is approximately 20° C. higher than the softening point of the varnish layer 14. In this way the diffraction behaviour of individual markings 5 can be altered by the addition of thermal energy by means of a so-called erasing head as described, for example, in Swiss patent CH 640 075, without the side of the data carrier 1 facing the erasing head tending to stick to the erasing head. Swiss patent CH 604 146 describes how with a localised heating effect an optically effective relief pattern applied to a plastics surface changes at the heated points such that the structure which the plastics surface had before the embossing is re-formed. A data carrier 1 with markings 5 which are identical after embossing can be individualised by the alteration of individual markings 5. A further possibility for simple individualising is in the use of a guided laser beam according to the teaching of U.S. Pat. No. 5,331,443.

Figure 3:
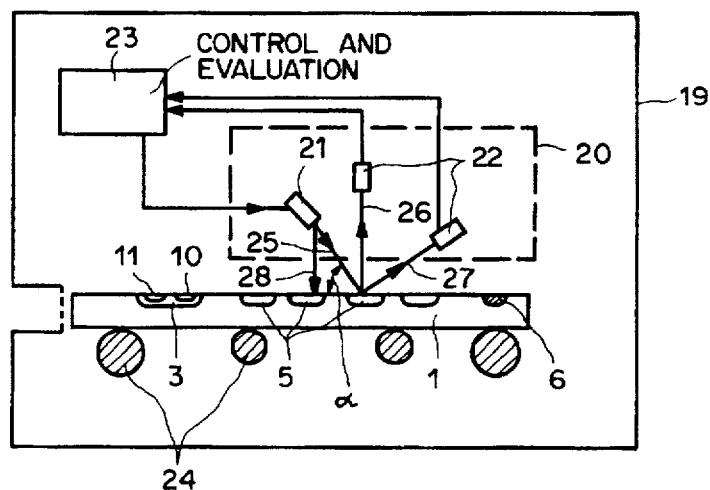
FIG. 3 shows a write/read device.

FIG. 3 shows a write/read device 19 which is suitable for machine reading of the markings 5 as well as for exchange of data with the optical interface 3 of the data carrier 1. The write/read device 19 includes a reading head 20 with a light source 21 and at least two photo detectors 22 which are electrically connected to a control and evaluation unit 23, as well as optical imaging elements (not shown) for optimum guiding of the light beams. The write/read apparatus 19 optionally includes an apparatus 24 for mechanical transportation of the data carrier 1. The light source 21, when switched on, produces a directed, advantageously approximately monochromatic light beam 25. Two photo detectors 22 are arranged such that on the one hand they can measure the intensity of the split beams 26, 27 of the first minus or respectively first plus order of diffraction so long as the light beam 25 falls on one of the markings 5 and is diffracted there, and that at least one of the two photo detectors 22 can detect the light produced by the light source 10 of the optical interface 3 of the data carrier 1 as soon as the data carrier 1 is completely inserted into the write/read device 19. Preferably, the light beam 25 falls inclined at an angle a on the plane defined by the surface of the data carrier 1, wherein the angle a is determined such that the split beam 26 of the first order of diffraction is diffracted back in an approximately vertical direction. In order for the reading head 20 to be useable as an optical interface for the device for the exchange of data with the optical interface 3 of the data carrier 1, when the direction of the light beam 25 is inclined, the light source 21 preferably produces a second, approximately vertical light beam 28 which falls on the light-sensitive cells 11 of the data carrier 1 when the data carrier 1 is inserted into its end position in the write-read device 19. At the same time one of the photo detectors 22 is then located vertically above the light source 10 of the data carrier.

The information strip 4 with the markings 5 and the optical interface 3 of the data carrier 1 are arranged along the axis y (FIG. 1) such that when the data carrier 1 is manually inserted or mechanically drawn into the write/read device 19, the markings 5 move past the reading head 20. When the data carrier 1 is inserted or drawn in, the light source 21 is switched on and the control and evaluation unit 23 tests whether the intensity of the split beams 26, 27 diffracted onto the photo detectors 22 fulfils pre-determined criteria. If the optical markings 5 are, for example, a saw-toothed relief profile with pre-determined grating dimensions, as shown in FIG. 2, the control and evaluation unit 23 tests each such marking 5 as to whether the ratio of the signal produced by the first photo detector 22 is greater by a factor predetermined by the properties of the relief profile than the signal produced by the second photo detector 22. Insofar as the markings 5 are configured as confined fields which are separated by a gap with different optical properties, the signals produced by the photo detectors 22 allow simple determination of the number of markings 5 present on the data carrier 1. The control and evaluation unit 23 tests whether this number is equal to a given number. This test, essentially involving physical properties, allows more reliable proof of the authenticity of the data carrier 1. A separate feed track is not necessary with these markings 5 configured as confined fields. Nevertheless, a separate feed track and a further photo detector for reading the feed track can be provided.

Several diffraction gratings with different relief profiles can also be used for the markings 5, which preferably all have the same grating constant and the same grating orientation so that they are recognisable and can be differentiated using two photo detectors 22. In this case the control and evaluation unit 23 tests, according to criteria similar to those described above, whether and possibly which type of diffraction grating is assigned to the light diffracted and detected from a marking 5. It is possible, for example, to provide the three different diffraction gratings A, B, C shown in FIG. 2, which differ in their symmetry with respect to the axis y. The arrangement of, for example, 21 diffraction gratings in the order A, B, C in the information strips 4 thereby produces an internal structure for the entirety of the markings 5 which can be tested by the control and evaluation unit 23. The difficulty of forging a data carrier 1 with optical markings 5 increases with the complexity of the diffraction structures forming the markings 5 and also with the number of photo detectors 22 which are used for detecting the type of marking 5 in the write/read device 19.

Each marking 5 represents one bit or a higher value figure according to the complexity of the diffraction structure which forms it, and can additionally include pulse or clock information. A higher value figure is hereinafter considered as being representable by a bit sequence. The entirety of the markings 5 is consequently a bit pattern which is machine readable. If, for example, the information strip 4 is provided with n strips which are each one bit, that is to say represent a binary figure, when the data carrier 1 is inserted the write/read device 19 then reads a "$b_1, b_2, b_3 \ldots b_n$" bit pattern. Some of these bits $b_1, b_2, b_3$ to $b_n$ now advantageously represent test bits, so that the write/read device 19 can carry out a test using the test bits, in addition to the above-described physical testing, as to whether the $b_1, b_2, b_3 \ldots b_n$ bit pattern read has an internal bit structure which satisfies pre-determined rules. This allows a reliable decision as to whether it is a normal bit pattern or a forged bit pattern. To correct occasional reading mistakes some of the bits $b_1, b_2, b_3$ to $b_n$ can additionally be provided as redundant bits for error recognition.

A bit pattern can generally be described as a digital signature S. The digital signature S does not necessarily have to be equal to the bit pattern $b_1, b_2, b_3 \ldots b_n$. It is also possible for the write/read device 19 to derive a new bit pattern "$c_1, c_2, c_3 \ldots c_k$" from k bits which serves as a digital signature S, by means of a predetermined algorithm from the bit pattern $b_1, b_2, b_3 \ldots b_n$. The number k can be smaller, equal to or greater than the number n. The digital signature S can additionally include information, for example, an expiry date for the data carrier 1, so that the write/read device 19 does not carry out any transactions with the data carrier 1 when its validity period has expired.

The use of an information strip 4 with optical markings 5 which cannot be copied with a copier, are extremely difficult to forge and which are connected in a practically inseparable manner to the data carrier 1 already makes the unauthorised circulation of such data carriers 1 difficult. The possibilities for fraud are additionally reduced when the write/read device 19 carries out a test of authenticity based solely on the physical properties of the markings 5, and tests whether the internal data structure of the signature S satisfies pre-determined rules. Examples for an internal data structure of the signature S are the previously described use of different diffraction gratings which are arranged in a specific order, or the use of test bits which are calculated according to pre-determined rules.

Security against forgeries can be further enhanced by linking the signature S with data stored in the data carrier 1. Examples of such linkages will hereinafter be explained in more detail.

In a first type of linkage a test number P is stored in the information memory 9 (FIG. 1), which is calculated solely as a function f of the signature S:P=f(S) or as a function g of the signature S and further data Dp:P=g(S,Dp) stored in the data carrier 1. With the so-called SLE4436 Eurochip from the Siemens SLE443x chip series or chips compatible therewith, the 16 bit "Aux. Data Area" for example, can be used for storing the test number P. When the data carrier 1 is used, the write/read device 19 tests its authenticity, in that it determines the signature S, requests the test number P from the data carrier 1 and possibly the data Dp, calculates the value of the function $P_f$=f(S) or respectively $P_g$=g(S,Dp) and tests the equality of the numbers P and $P_f$ or respectively P and $P_g$. The transfer of the test number P and the data Dp is advantageously carried out in an encoded manner.

A still higher degree of security against attempted fraud can be obtained in that with each transfer of data, the write/read device 19 encodes a random number according to known methods, for example the DES (Data Encryption Standard) and sends it too, in encoded and non-coded form, to the data carrier 1. The electronic circuit 2 of the data carrier 1 is set up to decode the random number transferred encoded and to compare it with the random number transferred non-coded. The transmission of the test number P and/or other data Dp to the write/read device 19 occurs only when the encoded random number is the same as the non-coded random number. Interrogation of the data carrier 1 by an unauthorised write/read device 19 is impossible because of this simple test of authenticity.

A further possibility for obtaining a high degree of security against fraud is that the write/read device 19 captures all the commands and/or data to be transferred to the electronic circuit 2 of the data carrier 1 in the form of a character string Z1, encodes said character string Z1 with an encoding algorithm wherein the signature S serves as the cipher key, and transfers it to the data carrier 1. By means of the complementary deciphering key which is stored in a memory area 8 inaccessible to the outside world, the electronic circuit 2 of the data carrier 1 decodes data received into the character string Z2. When the command and/or data is encoded with a wrong code, the character string Z2 is incomprehensible, so the data carrier 1 neither transmits a response to the write/read device 19 nor allows a change in one of its memory areas 8. The exchange of data from the data carrier 1 to the write/read device 19 can be protected in the same way, in that the electronic circuit 2 encodes the data to be transferred with a cipher key complementary to the signature S. The transferred data can only be interpreted by the write/read device 19 when the decoding takes place by means of the deciphering key represented by the signature S.

Through the use of a method of this type it is possible to keep the risk of fraudulent loading of a re-loadable data carrier 1, for example a tariff card for paying telephone charges, or the risk of unauthorised writing into a data carrier provided for that purpose, for example a health insurance card, extremely small.

With this second type of linkage, the signature S serves as a cryptographic key for decoding and encoding data to be exchanged with the electronic circuit 2 of the data carrier 1, wherein the complementary key to the signature S is stored in a memory 8 of the data carrier 1 not accessible to the outside world. The signature S represents a key which on the one hand is similar to a "public key" in the sense that the write/read device 19 reads the key which it requires for the exchange of data with the data carrier 1 from the data carrier 1 by means of the reading head 20. On the other hand the signature S is similar to a "secret key" in that the signature S is known only to the write/read device 19 and is scarcely or only with extreme difficulty accessible to a person or another machine. The expressions "public key" and "secret key" are described in more detail in the article "Datenverschlüsselung in der Chipkarte" in Vol. 22/1994 of the magazine "Elektronik". Each data carrier 1 is additionally advantageously provided with its own individual signature S, whereby the risk of incorrect use of such data carriers 1 can be further reduced.

A so-called PIN code (Personal Identification Number) is further assigned to each data carrier 1, which should be known only to the owner of the data carrier 1, and serves to make transactions between the data carrier 1 and the write/read device 19 possible only when the user enters the PIN code correctly. The PIN code thus serves as the proof of authorised use of the data carrier 1. The testing of the PIN code can be done in that the write/read device 19 either links the PIN code entered by the user to the signature S according to a pre-determined function, or encodes it by means of the signature S and transfers it to the data carrier 1, where the data carrier 1 compares the transferred data with a stored specified PIN code, either directly or after decoding, and sends back the response, also in an encoded form, as to whether the PIN code has been correctly entered. It is also possible for the data carrier 1 not to transfer any data to the write/read device 19 when the comparison between the PIN code and the specified PIN code is negative.

The markings 5 (FIG. 1) in the information field 4 can also be arranged in a two-dimensional matrix. The markings 5 can further serve as a ROM memory or, if the relief structures 13 which form the markings 5 are irreversibly modifiable, as a WORM (write once read many times) memory. In the latter case it is possible that each marking 5 of the WORM memory represents a pre-determined amount of credit when the data carrier 1 is issued. Each time when the use of the data carrier 1 results in a reduction in the amount of credit, the new, reduced amount of credit is written into the WORM memory. According to another method, each marking 5 represents a pre-determined monetary value G. The total credit value of the data carrier 1 is produced by the number of unmodified markings 5 times this monetary value G, plus a remaining value R which is stored in the memory. The remaining value R is always smaller than the monetary value G and consequently represents smaller units than the monetary value G. When there is a debit, on the one hand the new remaining value R is written into the memory 8 and on the other hand the required total number of markings 5 is possibly irreversibly modified. The WORM memory can also serve as storage for data other than monetary values. As the markings 5 can have dimensions which amount to only a few micrometres, a high degree of storage density is possible.

In a further development the test field 6 is provided on the data carrier 1, which can be irreversibly modified by the write/read device 19 using a means provided for this purpose, so that use of the data carrier 1, in particular initial use, is detectable even when the data carrier 1 is mechanically and/or electrically damaged such that the data stored in the data carrier 1 can no longer be read. The irreversible modification of the test field 6 can be produced using different, simple technologies. For example, the covering layer of the data carrier 1 can contain a dye which changes its colour as seen by the human eye or an IR or UV detector due to a photo-chemical or thermal reaction. The test field 6 can be configured as a field with a diffraction structure, similar to a marking 5, wherein the diffraction structure can be irreversibly modified by the application of heat such that, for example, it scatters incident light in a diffuse manner in all directions and consequently appears matt. A particularly simple embodiment is produced with a write/read device 19 with a transport apparatus 24, when a light-emitting diode or laser diode is present as the light source 21 which can be briefly switched to a high powered mode to irreversibly modify the test field 6. With this, the control and evaluation unit 23 controls the transport apparatus 24 and the light source 21 such that the data carrier 1 is stopped when inserted or withdrawn when the test field 6 is located in the focal point of the light source, and that the light source 21 then emits a sufficiently high powered light to achieve the desired modification of the test field 6. With a write/read device 19 with manual data carrier 1 insertion, a separate light source can be provided, in which case the test field 6 can be placed anywhere on the data carrier 1. The time of the irreversible modification of the test field 6 then has no limitations, and can be selected as desired as long as the data carrier 1 is inserted in the write/read device 19, for example when the PIN code is entered or before a change to be made in the information memory 4 of the data carrier 1. A preferred time for modifying the test field 6 when using a write/read device 19 installed in a telephone point is the time when the telephone connection has taken place. Instead of a light source for optical modification of the test field 6, a means for mechanical modification can be provided, that is to say possibly a heatable die or embossing tool.

A particularly high degree of protection against imitation is produced when the covering layer is printed in the area of the markings 5 such that the markings 5 are unrecognisable to a human viewer without the machine readability of the markings 5 being affected. A further possibility for manufacturing markings 5 unrecognisable to the human eye is in omitting the reflective layer 15 shown in FIG. 2, and using materials for the varnish layer 14 and the adhesive layer 16 which have different optical refraction indices within the visible range with values of approximately 1.5, wherein however the refraction indices differ from one another by less than 0.2. The difference in the refraction indices can however be significantly greater in the IR or UV ranges so that the machine readability of the markings 5 is ensured. Such a layer composition 12 can appear crystal clear or transparently coloured or even opaque to the human eye.

The information strip 4 (FIG. 1) and the authentication feature 7 can be produced using the same technology as for the layer composition 12, wherein the good visibility due to the reflective layer 15 is preferably present at least in the area of the authentication feature 7.

Figure 4:
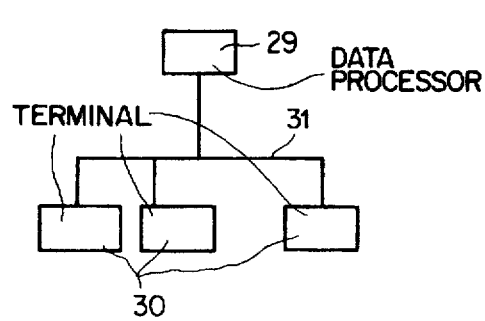
FIG. 4 is a block diagram of an apparatus with a data processing point.

FIG. 4 shows an apparatus which includes a data processing apparatus 29 and several terminals 30 each with a write/read device 19 for communicating with data carriers 1 which are provided with an information strip 4 with optical markings 5 (FIG. 1), wherein the markings 5 contain a machine readable digital signature. The data processing apparatus 29 and the terminals 30 are connected by a communication network 31. The terminals 30 can fulfil different functions, one terminal can, for example, be a public telephone which makes a desired telephone connection if the telephone can debit the appropriate monetary value from the data carrier 1 or obtains a credit limit and an address where the user of the telephone network can be asked for the telephone charge due. Another terminal 30 can be used for controlling the entry into a specific area. The write/read device 19 is fitted with an optical reading head 20 (FIG. 3) for reading the signature of the data carrier 1, so that when the data carrier 1 is used, the write/read device 19 reads the signature of said data carrier 1 and transfers it to the data processing apparatus 29. In this way the use of the data carrier 1 can be traced in terms of location and time. If required, each data communication between one of the terminals 30 and a data carrier 1 can be recorded. With this, it is particularly of interest that with data carriers 1 which serve as electronic purses, each cash purchase and each cash payment (reloading with money) together with the signature can be recorded, however without the information stored in the data carrier 1 about the identity of the owner. This allows control of each data carrier 1 as to whether no more money can be drawn from the purse than has legitimately been paid in. If necessary the blocking of the data carrier 1 can be ordered without the user of the data processing apparatus 29 needing to know the identity of the legitimate owner. The blocking can selectively also take place only for certain services. The data processing apparatus 29 can be set up centrally or decentralised and be connected to further data processing apparatuses such as, for example, credit card organisations, banks, data banks and so on.

The embodiment described includes several possibilities for implementation which increase the security of a data carrier according to the preamble of claim 1 step by step. The use of the optical interface 3 instead of electrical contacts or coils also provides a contribution to security, as the communication of data between the data carrier 1 and the write/read device 19 is scarcely accessible to external measuring devices. Furthermore, the optical interface 3 can be operated with low expenditure on electronic circuitry.

Figure 5:
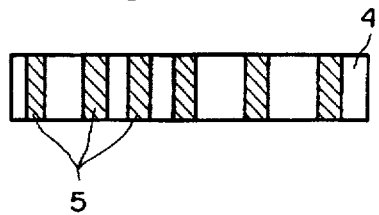
FIG. 5 illustrates an information strip configured as a bar code.

There are many further possibilities for producing an information strip 4 (FIG. 1) with optical, machine readable markings 5 which require considerable expense and knowhow. The markings 5 can also be composed of fluorescent inks and, as shown in FIG. 5, form a bar code wherein a longer or shorter distance between the markings 5 can be interpreted as bit "0" and respectively bit "1". The proof of authenticity is based upon the physical fluorescent properties of the inks. When the data carrier 1 is inserted a suitable write/read device 19 shines a light impulse with a suitable wave length on each of the markings 5 and subsequently determines the time constant of the after-glow of the fluorescing inks, wherein the time constant serves as the authentication feature.

The electronic circuit 2 is often a pre-fabricated module. The optical markings 5 (FIG. 1) can be applied or moulded onto the data carrier 1 or on an electronic component such as, for example, the information memory 4 or the microprocessor in the electronic circuit 2. With this, laminates made from plastics foils which can be applied with a hot die method or with an adhesive which can be activated at room temperature are suitable for receiving the markings 5 as described above. It is also conceivable either to etch a diffraction grating in the silicon surface of a memory chip or of the microprocessor using a method known from micro-engineering, or to coat the surface of the memory chip or microprocessor with a UV-hardenable varnish and then to mould in the diffraction grating.

The write/read device 19 is a part of a device which is, for example, a public telephone point, a shopping or service vending machine or a device for testing a data carrier 1 serving as pass.

Although illustrative embodiments of the invention have now been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data carrier having an electronic circuit for storing and processing data and for communicating with a write/read device, said data carrier having unaltered and, by supplying thermal energy, irreversibly altered optical diffraction markings for proving authenticity of said data carrier, wherein said markings represent a digital signature which is machine readable and wherein data which is linked to said signature is stored in said electronic circuit.

2. A data carrier according to claim 1, wherein said optical diffraction markings are microscopically small relief structures with an asymmetrical profile shape.

3. A data carrier according to claim 1, wherein said data stored in said electronic circuit is a test number solely calculated from said signature according to a pre-determined function, and wherein said electronic circuit is arranged to transfer data to said write/read device only after carrying out a test of authenticity with a positive outcome.

4. A data carrier according to claim 1, wherein further data is stored in said electronic circuit of said data carrier, wherein said data stored is a test number calculated from said signature and said further data according to a predetermined function, and wherein said electronic circuit is arranged to transfer data to said write/read device only after carrying out a test of authenticity with a positive outcome.

5. A data carrier according to claim 1, wherein said signature represents a cryptographic key for encoding or decoding of data to be exchanged with or received from said write/read device, wherein said data stored in said electronic circuit represents a cryptographic key complementary to said signature, and wherein the exchange of data between said electronic circuit and said write/read device takes place in an encoded manner.

6. A data carrier according to claim 1, wherein a specified PIN code is stored in said electronic circuit, and wherein said circuit is arranged only to transfer data to said write/read device when a PIN code entered by a user into said write/read device and transmitted encoded by said signature agrees with said specified PIN code.

7. A data carrier according to claim 1, including a test field for detecting the use of said data carrier, wherein said test field is configured to be irreversibly modified.

8. A write/read device for a data carrier according to claim 1, the write/read device comprising an optical reading head having a light source and photo detectors for reading said markings of said data carrier, and a control and evaluation apparatus, said control and evaluation apparatus being arranged to test signals produced by said photo detectors during reading of said markings as to whether they satisfy specific criteria and whether a pre-determined number of said markings is present on said data carrier.

9. A write/read device according to claim 8, wherein said write/read device is arranged to link a PIN code entered by a user and said signature according to a pre-determined function and to transfer it to said data carrier.

10. A write/read device according to claim 8, wherein said write/read device is arranged to encode a pin code entered by a user by means of said signature and to transfer it to said data carrier.

11. A write/read device for a data carrier according to claim 7, the write/read device comprising an optical reading head having a light source and photo detectors for reading said markings of said data carrier, and a control and evaluation apparatus, said control and evaluation apparatus being arranged to test signals produced by said photo detectors during reading of said markings as to whether they satisfy specific criteria and whether a pre-determined number of said markings is present on said data carrier, wherein said write/read device includes means for modifying said test field of said data carrier.

12. Apparatus comprising a data processing apparatus and at least one terminal having a write/read device for communication with a data carrier according to claim 1, wherein said data processing apparatus and said terminal are connected by a communication network, wherein said write/read device is provided with an optical reading head for reading said signature of said data carrier, and wherein, when said data carrier is used, said signature is transferred to said data processing apparatus.

* * * * *